United States Patent
Horihata (10) Patent No.: US 8,513,924 B2
(45) Date of Patent: Aug. 20, 2013

(54) VEHICLE GENERATOR

(75) Inventor: Harumi Horihata, Nagoya (JP)

(73) Assignee: Denso Corporation, Kariya (JP)

( * ) Notice: Subject to any disclaimer, the term of this patent is extended or adjusted under 35 U.S.C. 154(b) by 352 days.

(21) Appl. No.: 13/030,331

(22) Filed: Feb. 18, 2011

(65) Prior Publication Data

US 2011/0204856 A1  Aug. 25, 2011

(30) Foreign Application Priority Data

Feb. 23, 2010 (JP) ................................. 2010-037099

(51) Int. Cl.
 *H02P 9/00* (2006.01)
(52) U.S. Cl.
 USPC ............................................. 322/24; 322/20
(58) Field of Classification Search
 USPC ...................................................... 322/20, 24
 See application file for complete search history.

(56) References Cited

U.S. PATENT DOCUMENTS

| | | | | |
|---|---|---|---|---|
| 5,663,618 | A * | 9/1997 | Adachi et al. | 318/400.35 |
| 5,723,973 | A * | 3/1998 | Umeda et al. | 322/20 |
| 5,834,911 | A * | 11/1998 | Kimura | 318/400.11 |
| 6,121,736 | A * | 9/2000 | Narazaki et al. | 318/400.35 |
| 6,160,367 | A * | 12/2000 | Higashi et al. | 318/400.1 |
| 6,232,730 | B1 * | 5/2001 | Doyama et al. | 318/400.04 |
| 6,373,729 | B1 * | 4/2002 | Shimazaki et al. | 363/37 |
| 6,806,670 | B2 * | 10/2004 | Kusaka | 318/437 |
| 6,940,259 | B2 * | 9/2005 | Suzuki et al. | 322/20 |
| 7,081,738 | B2 * | 7/2006 | Muramatsu et al. | 322/24 |
| 7,157,885 | B2 * | 1/2007 | Nakagawa et al. | 322/28 |
| 7,245,036 | B2 * | 7/2007 | Endou et al. | 290/40 A |
| 7,253,590 | B2 * | 8/2007 | Suzuki et al. | 322/20 |
| 7,683,587 | B2 * | 3/2010 | Inaba et al. | 322/20 |
| 8,027,180 | B2 * | 9/2011 | Nakagawa | 363/98 |
| 8,084,975 | B2 * | 12/2011 | Harada | 318/400.33 |
| 8,106,612 | B2 * | 1/2012 | Harada et al. | 318/400.17 |
| 2003/0210006 | A1 * | 11/2003 | Kusaka | 318/437 |
| 2006/0097703 | A1 * | 5/2006 | Suzuki et al. | 322/20 |
| 2008/0067981 | A1 * | 3/2008 | Inaba et al. | 322/20 |
| 2008/0225565 | A1 | 9/2008 | Tsujimoto et al. | |

(Continued)

FOREIGN PATENT DOCUMENTS

| | | |
|---|---|---|
| JP | A-2006-217780 | 8/2006 |
| JP | B2-4275704 | 6/2009 |
| JP | 2011176903 A * | 9/2011 |

OTHER PUBLICATIONS

Mar. 25, 2013 Office Action issued in Chinese Patent Application No. 201110043753.7 (with English Translation).

*Primary Examiner* — Pedro J Cuevas
(74) *Attorney, Agent, or Firm* — Oliff & Berridge, PLC (57) ABSTRACT

The vehicle generator includes an armature winding including a plurality of phase windings, a switching section formed as a bridge circuit constituted of a plurality of pairs of an upper arm and a lower arm connected in series to rectify voltages induced in the phase windings, each of the upper and lower arms being constituted of a switching element parallel-connected with a diode, a control section for controlling on/off timings of the switching elements, and a voltage zero-cross detecting section for performing voltage zero-cross detection to detect, as voltage zero-cross points, time points at which at least one of line-to-line voltages among the phase windings of the armature winding changes in polarity. The control section is configured to start on-off control of the switching elements based on the voltage zero-cross points detected by the voltage zero-cross detecting section.

6 Claims, 7 Drawing Sheets

(56) References Cited

U.S. PATENT DOCUMENTS

| | | | |
|---|---|---|---|
| 2009/0102437 A1* | 4/2009 | Nakagawa | 323/217 |
| 2010/0109589 A1* | 5/2010 | Harada | 318/400.33 |
| 2010/0117572 A1* | 5/2010 | Harada et al. | 318/400.11 |
| 2011/0156664 A1* | 6/2011 | Horihata | 322/24 |
| 2011/0215773 A1* | 9/2011 | Iwai | 322/28 |

* cited by examiner

VEHICLE GENERATOR

This application claims priority to Japanese Patent Application No. 2010-37099 filed on Feb. 23, 2010, the entire contents of which are hereby incorporated by reference.

BACKGROUND OF THE INVENTION

1. Field of the Invention

The present invention relates to a vehicle generator mounted on a vehicle such as a passenger car or a truck.

2. Description of Related Art

There is known a vehicle-use power conversion apparatus having a structure in which a power conversion section is constituted of switching elements whose on/off timings are set in accordance with phase voltages of an armature winding of a vehicle generator. For example, refer to Japanese Patent No. 4275704. In this vehicle-use power conversion apparatus, the off timings and on timings of the switching elements are determined by comparing the phase voltages with a predetermined threshold voltage higher than the voltage of a vehicle battery.

However, the above conventional vehicle-use power conversion apparatus in which off timings of the switching elements are determined based on the phase voltages cannot start its rectifying operation until the phase voltages reach the predetermined threshold voltage. In some cases, this becomes a problem.

For example, when the switching elements are constituted of MOSFETs, it is possible to increase the output current of the vehicle generator by setting the off period of each switching element longer than a period in which a current flows through the body diode thereof in order to control the phase of the phase current so that a current flows from the vehicle battery into the phase winding through the switching element over a predetermined period (electrical angle). However, the above conventional vehicle-use power conversion apparatus cannot start such phase control while the rotational speed of the vehicle generator is so low that the phase voltage does not reach the threshold voltage, and accordingly the on/off control of the switching elements cannot be performed.

SUMMARY OF THE INVENTION

The present invention provides a vehicle generator comprising:

an armature winding including a plurality of phase windings;

a switching section formed as a bridge circuit constituted of a plurality of pairs of an upper arm and a lower arm connected in series to rectify voltages induced in the phase windings, each of the upper and lower arms being constituted of a switching element parallel-connected with a diode;

a control section for controlling on/off timings of the switching elements; and a voltage zero-cross detecting section for performing voltage zero-cross detection to detect, as voltage zero-cross points, time points at which at least one of line-to-line voltages among the phase windings of the armature winding changes in polarity;

the control section being configured to start on-off control of the switching elements based on the voltage zero-cross points detected by the voltage zero-cross detecting section.

According to the present invention, there is provided a vehicle generator capable of starting control of switching elements for rectification of the phase voltages induced in its phase windings even when the phase voltages are substantially low.

Other advantages and features of the invention will become apparent from the following description including the drawings and claims.

PREFERRED EMBODIMENTS OF THE INVENTION

Figure 1:
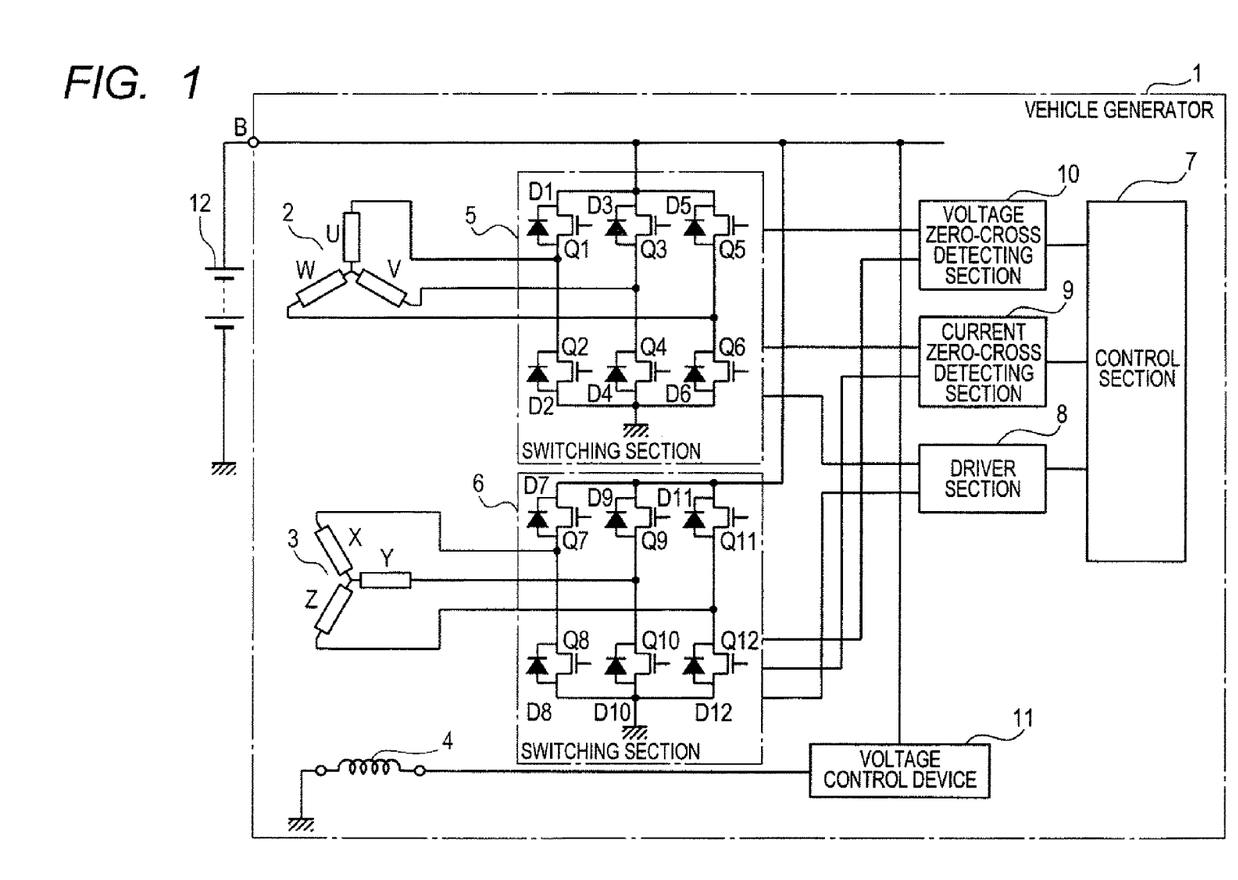
FIG. 1 is a diagram showing the structure of a vehicle generator according to an embodiment of the invention.

FIG. 1 is a diagram showing the structure of a vehicle generator 1 according to an embodiment of the invention. As shown in FIG. 1, the vehicle generator 1 includes armature windings 2 and 3, a field winding 4, switching sections 5 and 6, a control section 7, a driver section 8, a current zero-cross detecting section 9, a voltage zero-cross detecting section 10, and a voltage control device 11. This vehicle generator 1 performs power generating operation in which AC voltages induced in the armature windings 2 and 3 are rectified by the switching sections 5 and 6, and supplied to a battery 12 and various electrical loads (not shown). This vehicle generator 1 may be configured to perform also power-driven operation (motor operation) in which DC power supplied from the battery 12 is converted into three-phase AC voltage by the switching sections 5 and 6, and applied to the armature windings 2 and 3 to drive the rotor (not shown) of the vehicle generator 1 to rotate.

The armature winding 2, which is a multi-phase winding (three-phase winding in this embodiment), is wound around an armature core to constitute an armature. The AC outputs induced in the respective phase windings of the armature winding 2 are supplied to the switching section 5. The armature winding 3, which is a multi-phase winding (three-phase winding in this embodiment), is wound around an armature core to constitute an armature. The armature windings 2 and 3 are wound so as to have a positional displacement of 30° in electrical angle therebetween. The AC outputs induced in the respective phase windings of the armature winding 3 are supplied to the switching section 6. The field winding 4 is wound around not-shown magnetic poles to constitute a rotor of the vehicle generator 1. By passing a field current to the field winding 4, the magnetic poles are magnetized.

The switching section 5 is formed as a bridge circuit disposed between the armature winding 2 and the battery 12, and including a plurality of (three in this embodiment) upper arms and a plurality of (three in this embodiment) lower arms. Each of these arms is constituted of a switching element parallel-connected with a diode. More specifically, the armature winding 2 includes a U-phase winding, a V-phase winding and a W-phase winding which are Y-connected with one another. The U-phase winding is connected with a pair of a switching element Q1 and a diode D1 as an upper arm, and a pair of a switching element Q2 and a diode D2 as a lower arm. The V-phase winding is connected with a pair of a switching element Q3 and a diode D3 as an upper arm, and a pair of a switching element Q4 and a diode D4 as a lower arm. The W-phase winding is connected with a pair of a switching element Q5 and a diode D5 as an upper arm, and a pair of a switching element Q6 and a diode D6 as a lower arm.

The switching section 6 is formed as a bridge circuit disposed between the armature winding 3 and the battery 12, and including a plurality of (three in this embodiment) upper arms and a plurality of (three in this embodiment) lower arms. Each of these arms is constituted of a switching element parallel-connected with a diode. More specifically, the armature winding 3 includes an X-phase winding, a Y-phase winding and a Z-phase winding which are Y-connected with one another. The X-phase winding is connected with a pair of a switching element Q7 and a diode D7 as an upper arm, and a pair of a switching element Q8 and a diode D8 as a lower arm. The Y-phase winding is connected with a pair of a switching element Q9 and a diode D9 as an upper arm, and a pair of a switching element Q10 and a diode D10 as a lower arm. The Z-phase winding is connected with a pair of a switching element Q11 and a diode D11 as an upper arm, and a pair of a switching element Q12 and a diode D12 as a lower arm.

In this embodiment, as the switching elements Q1 to Q12, there are used MOSFETs which are low loss compared to diodes commonly used for a rectifier circuit. In the case of using such MOSFETs, parasitic diodes (body diodes) of these MOSFETs can be used as the diodes D1 to D12.

The control section 7 determines on/off timings of the switching elements Q1 to Q12 included in the switching sections 5 and 6. The driver section 8 drives the switching elements Q1 to Q12 in accordance with the on/off timings determined by the control section 7. The control section 7 can be implemented by a control program executed by a CPU included therein. However, the control section 7 may be implemented by a hardware logic constituted of circuit elements.

The current zero-cross detecting section 9 detects, as current zero-cross points, time points at which the phase currents flowing through the switching elements Q1 to Q12 and the diodes parallel-connected thereto change in their directions when the switching elements Q1 to Q12 are on. The current zero-cross detecting section 9 detects zero-cross points individually for each of the upper and lower arms of the respective phase windings.

The voltage zero-cross detecting section 10 detects, as voltage zero-cross points, time points at which the line-to-line output voltages of the armature windings 2 and 3 change in their polarities. The voltage zero-cross detecting section 10 detects voltage zero-cross points individually for each of the armature windings 2 and 3. Incidentally, although the voltage zero-cross detecting section 10 is connected to the switching sections 5 and 6, it may be connected directly to the armature windings 2 and 3, respectively.

The voltage control device 11 controls the field current flowing through the field winding 4 by on-off controlling a not shown switching element. For example, the voltage control device 11 controls the field current such that the output voltage of the vehicle generator 1 or the battery voltage is kept at a predetermined regulation voltage.

Next, the operation of the vehicle generator 1 having the above described structure is explained. The switching elements Q1 to Q12 are each parallel-connected with the diode (body diode), and accordingly rectification of the induced voltages is performed even when they are not tuned on, because the phase currents can flow through the diodes. Here, a mode in which these switching elements turn on and off in accordance with the conducting periods of their diodes is referred to as "synchronous control mode". If each of the switching elements is kept on until a time later than the conducting period of its diode, a phenomenon occurs where a battery current is drawn from the battery 12 through the switching element when the phase voltage becomes lower than the terminal voltage of the battery 12. Here, a mode in which each of the switching elements is turned on and off to generate such a drawn current is referred to as "phase control mode".

The synchronous control mode is superior to the phase control mode in power generation efficiency. On the other hand, the phase control mode enables generation of a larger output current compared to the synchronous control mode. Accordingly, it is preferable that the vehicle generator 1 operates in the synchronous control mode when the required amount of power generation (or output current) is small, or when the rotational speed thereof is high, and operates in the phase control mode when the rotational speed thereof is low and the required amount of power generation is large.

Figure 2:
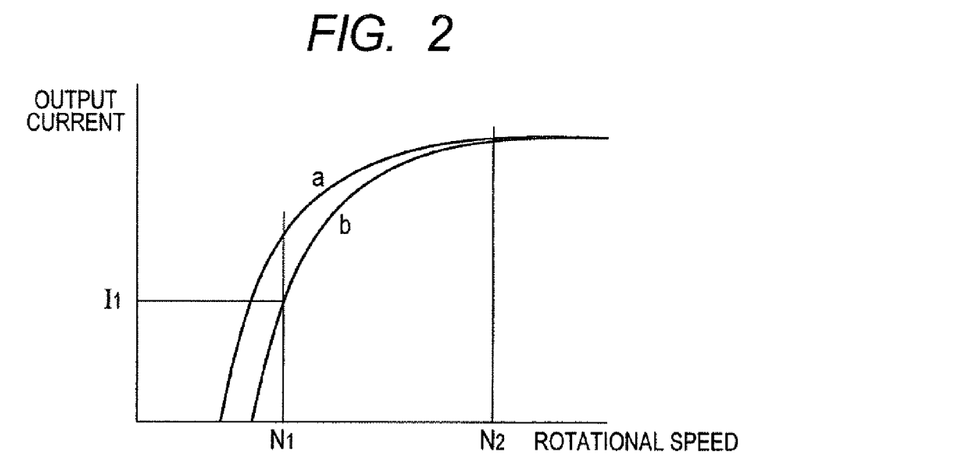
FIG. 2 is an explanatory view showing boundary between a synchronous control mode and a phase control mode of the vehicle generator of the embodiment.

FIG. 2 is an explanatory view showing boundary between the synchronous control mode and the phase control mode. In FIG. 2, the vertical axis represents the output current of the vehicle generator 1, and the horizontal axis represents the rotational speed of the vehicle generator 1. The curve a shows the output characteristic of the vehicle generator 1 when it operates in the phase control mode, and the curve b shows the output characteristic of the vehicle generator 1 when it operates in the synchronous control mode.

In this embodiment, the vehicle generator 1 operates in the synchronous control mode when the output current is smaller than or equal to I1 obtainable when the vehicle generator 1 operates in the synchronous control mode at the rotational speed of $N_1$. The vehicle generator 1 operates in the synchronous control mode also when the rotational speed thereof is higher than $N_2$ above which the output current becomes sufficiently large even when the vehicle generator 1 operates in the synchronous control mode, and there is no significant difference in the output current whether the vehicle generator 1 operates in the synchronous control mode or phase control mode.

In the following, it is explained how on/off timings of the switching elements are set for each of the synchronous control mode and the phase control mode.

Figure 3:
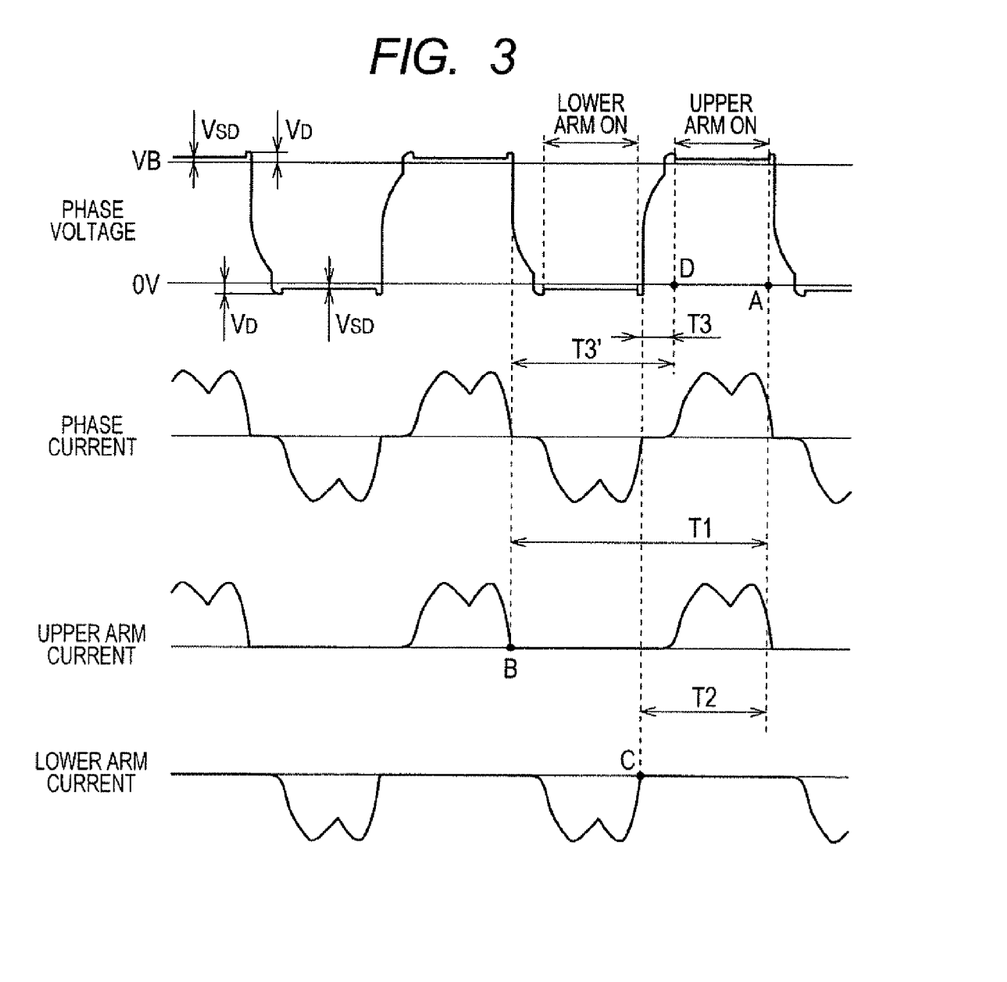
FIG. 3 is a diagram showing the phase voltage and phase current when the vehicle generator operates in the synchronous control mode.

First, explanation is made for the synchronous control mode. FIG. 3 is a diagram showing the U-phase voltage and U-phase current when the vehicle generator 1 operates in the synchronous control mode. The U-phase current can be divided into a first component flowing through the switching element Q1 and the diode D1 as an upper arm, and a second component flowing through the switching element Q2 and the diode D2 as a lower arm. In FIG. 3 and later described FIG. 4, the first component is shown as "upper arm current", and the second component is shown as "lower arm current". Further, in FIG. 3 and later described FIG. 4, $V_D$ indicates the forward voltage of the diode, and $V_{SD}$ indicates the source-drain voltage of the switching element when it is turned on.

In FIG. 3, the off timing A of the switching element Q1 of the upper arm corresponding to the U-phase winding is set to a time after lapse of a predetermined time T1 or T2 from the time of the previous current zero-cross point B of this upper arm, or from the time of the most recent current zero-cross point C of the lower arm corresponding to this same U-phase winding. This predetermined time T1 or T2 can be indicated as a predetermined electrical angle. In this case, to calculate the predetermined electrical angle, it is necessary to detect the rotational speed of the vehicle generator 1. In this embodiment, the control section 7 detects the rotational speed based on the interval of current zero-cross points of the upper arm current, or interval between current zero-cross points of the upper arm current and current zero-cross points of the lower arm current to set the predetermined time T1 or T2. Incidentally, it is possible to detect variation of the rotational speed by monitoring variation of the current zero-cross point interval for three or more current zero-cross points, in order to calculate more accurately the predetermined time T1 or T2 taking into account variation of the rotational speed.

Likewise, the control section 7 sets, as off timing of the switching element Q2 of the lower arm, a time after lapse of a predetermined time from the time of the previous current zero-cross point of this lower arm, or from the time of the most recent current zero-cross point of the upper arm corresponding to this same U-phase winding.

The on timing D of the switching element Q1 of the upper arm corresponding to the U-phase winding is set to a time after lapse of a predetermined time T3 from the time of the most recent current zero-cross point C of the lower arm corresponding to the U-phase winding. This predetermined time T3 can be indicated as a predetermined electrical angle. Like in the above, it is necessary to detect the rotational speed of the vehicle generator 1 to calculate the predetermined electrical angle, and it is possible to set more accurately the on timing by taking into account variation of the rotational speed.

Likewise, the control section 7 sets, as on timing of the switching element Q2 of the lower arm, a time after lapse of a predetermined time from the time of the most recent current zero-cross point of the upper arm corresponding to this same U-phase winding.

Incidentally, although on timing of each of the switching elements Q1 and Q2 is set based on the most recent current zero-cross point of the other arm in this embodiment, it may be set to a time after lapse of a predetermined time T3' from the time of the current zero-cross point of its arm.

The above explanation is for the method of determining on and off timings of the switching elements Q1 and Q2 corresponding to the U-phase winding. Since on timings of the switching elements Q3 to Q12 of the other phase windings can be set by the same method, explanations for setting on timings of the switching elements Q3 and Q12 are omitted here.

Figure 4:
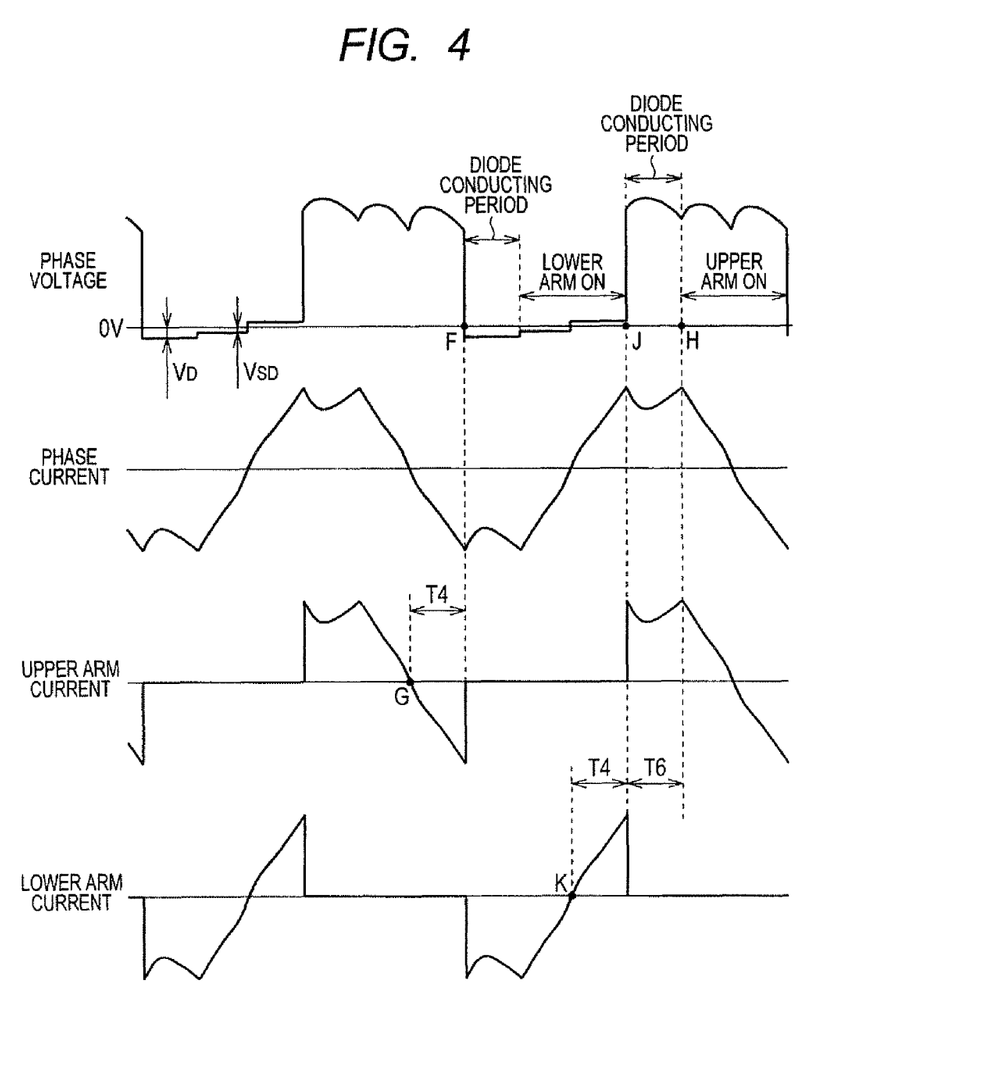
FIG. 4 is a diagram showing the phase voltage and phase current when the vehicle generator operates in the phase control mode.

FIG. 4 is a diagram showing the phase voltage and phase current (the U-phase voltage and U-phase current in FIG. 4) when the vehicle generator 1 operates in the phase control mode.

In FIG. 4, the off timing F of the switching element Q1 of the upper arm corresponding to the U-phase winding is set to a time after lapse of a predetermined time T4 from the time of the most recent current zero-cross point G of this upper arm. The predetermined time T4 is determined depending on the battery voltage and electrical load (required output). As in the case of the synchronous control mode, the predetermined time T4 can be indicated as a predetermined electrical angle, and it is necessary to detect the rotational speed of the vehicle generator 1 to calculate the predetermined electrical angle in order to set more accurately on and off timings by taking into account variation of the rotational speed.

Likewise, off timing of the switching element Q2 of the lower arm is set to a time after lapse of a predetermined time from the time of the most recent current zero-cross point of this lower arm.

The control section 7 determines, as the on timing H of the switching element Q1 of the upper arm corresponding to the U-phase winding, a time after lapse of a predetermined time T5 from the time J at which the switching element Q2 of the lower arm corresponding to this same U-phase winding was turned off. This predetermined time T5 is a margin time to ensure turning off of the switching element Q2 of the opposite arm in order to prevent a short circuit between the upper and lower arms. Like the setting of off timing described above, the predetermined time T5 can be indicated as a predetermined electrical angle, and it is necessary to detect the rotational speed of the vehicle generator 1 to calculate the predetermined electrical angle in order to set more accurately on timing by taking into account variation of the rotational speed.

Since off timing of the switching element Q2 of the lower arm is set to a time after lapse of the predetermined time T4 from the most recent current zero-cross point of the lower arm, it can be said that on timing of the switching element Q1 of the upper arm is set to a time after lapse of the time of T4+T5 from the time of the most recent current zero-cross point K of the lower arm.

Likewise, the control section 7 sets, as on timing of the switching element Q2 of the lower arm, a time after lapse of a predetermined time from the time of the most recent current zero-cross point of the upper arm corresponding to this same U-phase winding.

Meanwhile, when the output voltage (the phase voltages) of the vehicle generator 1 is lower than a predetermined voltage, it is not possible to detect current zero-cross points corresponding to the respective phase windings, because no current flows through the switching elements and the diodes. When the required current is small, it is possible to wait to switch from the synchronous control mode to the phase control mode until the phase voltages become high and an output current passing through the diodes is obtained. However, when the required current is large, it is preferable that the vehicle generator 1 starts to operate in the phase control mode from the rotational speed as low as possible. This embodiment is provided with the voltage zero-cross detecting section 10 to enable starting the phase control mode in order to draw out the output current before the output current passes through the diodes.

The zero-cross detecting section 10 takes in the line-to-line output voltage of the armature winding 2 (for example, takes in the voltage between one end of the U-phase winding and one end of the V-phase winding), detects a voltage zero-cross point at which this line-to-line voltage changes in polarity (from positive to negative or vice versa), and outputs a signal indicative of the detection result to the control section 7. Further, the zero-cross detecting section 10 takes in the lineto-line output voltage of the armature winding 3 (for example, takes in the voltage between one end of the X-phase winding and one end of the Y-phase winding), detects a voltage zero-cross point at which this line-to-line voltage changes in polarity (from positive to negative or vice versa), and outputs a signal indicative of the detection result to the control section 7. The detection of voltage zero-cross points is performed when the phase voltages of the armature windings 2 and 3 are lower than the battery voltage, and accordingly no current is outputted from the switching sections 5 and 6, and when all the switching elements included in the switching elements 5 and 6 are off. The signal indicative of the detection result may be a pulse signal generated at the timing when the polarity of the line-to-line voltage change, or a rectangular wave signal whose level is set in accordance with the polarity of the line-to-line voltage (for example, high level when the polarity is positive, and low level when the polarity is negative).

The control section 7 starts control for the phase control mode where on timings (or on and off timings) of the switching elements included in the switching sections 5 and 6 are set in accordance with the signal received from the voltage zero-cross detecting section 10. Once the control for the phase control mode is started, the phase control based on the detection result supplied from the current zero-cross detecting section 9 is performed thereafter.

Figure 5:
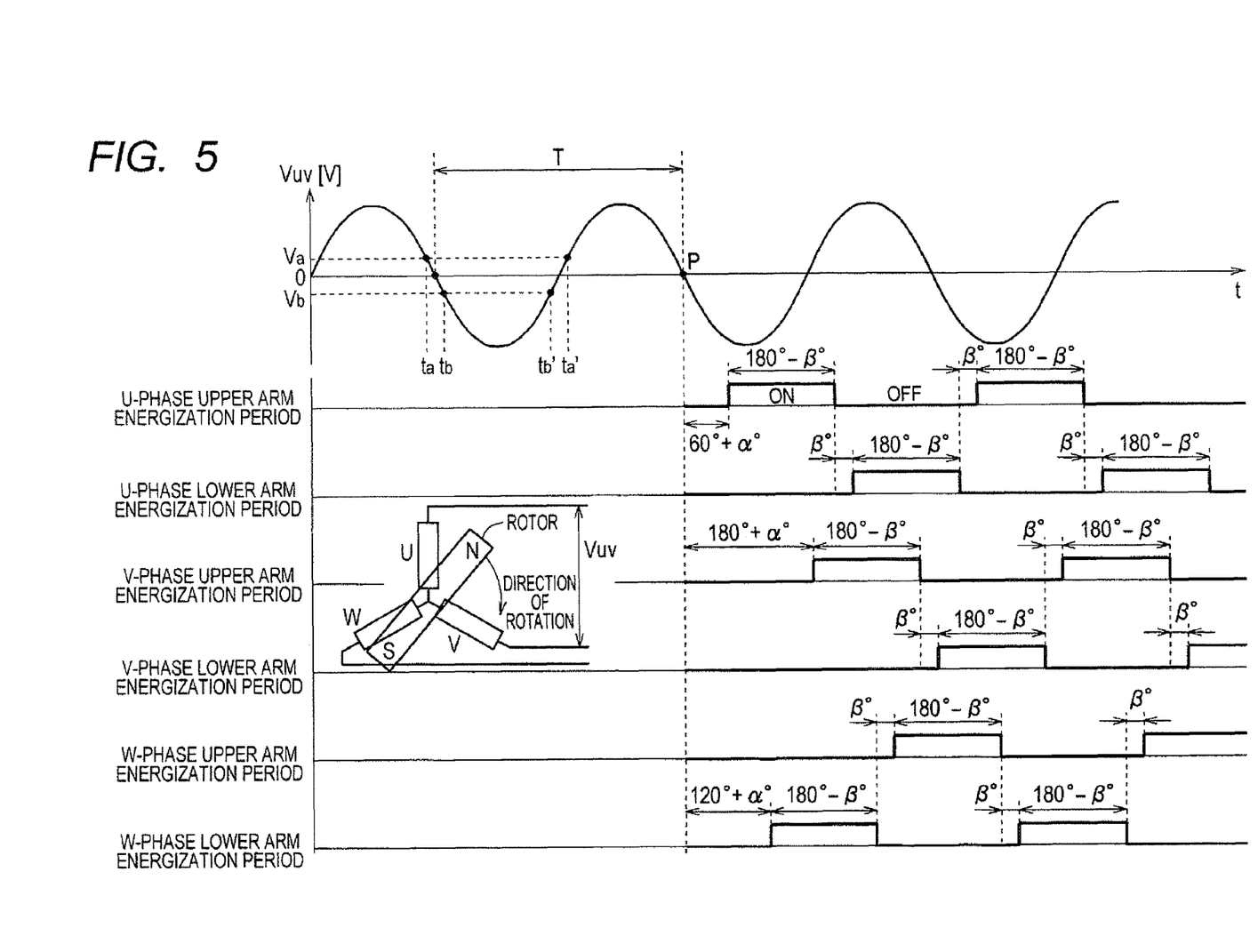
FIG. 5 is a diagram for explaining an example where the phase control is started by detecting voltage zero-cross points between the output lines of the U-phase and V-phase windings of one armature winding of the vehicle generator.

FIG. 5 is a diagram for explaining an example where the phase control is started by detecting voltage zero-cross points of the voltage between the output lines of the U-phase and V-phase windings. In FIG. 5, Vuw indicates the voltage between the output lines of the U-phase and V-phase windings as the line-to-line voltage, "U-phase upper arm energization period" indicates a period in which the switching element Q1 of the upper arm corresponding to the U-phase winding is on, "U-phase lower arm energization period" indicates a period in which the switching element Q2 of the lower arm corresponding to the U-phase winding is on, "V-phase upper arm energization period" indicates a period in which the switching element Q3 of the upper arm corresponding to the V-phase winding is on, "V-phase lower arm energization period" indicates a period in which the switching element Q4 of the lower arm corresponding to the V-phase winding is on, "W-phase upper arm energization period" indicates a period in which the switching element Q5 of the upper arm corresponding to the W-phase winding is on, and "W-phase lower arm energization period" indicates a period in which the switching element Q6 of the lower arm corresponding to the W-phase winding is on.

The switching element Q1 of the upper arm and the switching element Q2 of the lower arm corresponding to the U-phase winding is started in the following sequence.

(1) The voltage zero-cross detecting section 10 detects one of the following time points (a) to (e) as a voltage zero-cross point.

(a) A time point when the line-to-line voltage Vuv reaches 0 V.

(b) A time point when the line-to-line voltage Vuv reaches a predetermined voltage Va higher than 0 V.

(c) A time point when the line-to-line voltage Vuv reaches a predetermined voltage Vb lower than 0 V.

(d) A time point when the line-to-line voltage Vuv falls below the predetermined voltage Vb or rises above the predetermined voltage Va, or when the line-to-line voltage Vuv falls below the predetermined voltage Va or rises above the predetermined voltage Vb.

(e) A time point when the time becomes ta+(tb−ta)/2, where ta is the time at which the line-to-line voltage Vuv falls below the predetermined value Va, and tb is the time at which the line-to-line voltage Vuv thereafter falls below the predetermined value Vb, or when the time becomes tb'+(ta'−tb')/2, where tb' is the time at which the line-to-line voltage Vuv rises above the predetermined value Vb, and ta' is the time at which the line-to-line voltage Vuv thereafter rises above the predetermined value Va.

In this embodiment, since timing to start the phase control is set based on zero-cross points occurring when the line-to-line voltage is lowering, the detection of zero-cross points may be performed only while the line-to-line voltage lowers.

(2) The control section 7 determines the period T of the line-to-line voltage based on the interval of the detected zero-cross points.

(3) The control section 7 turns on the switching element Q1 of the upper arm corresponding to the U-phase winding after lapse of electrical angle of $60°+\alpha°$ (that is, after lapse of time of $((60°\pm\alpha°)/360°)\times T$) from the time of the voltage zero-cross point P (see FIG. 5) detected when the line-to-line voltage is lowering. Here, $\alpha$ is set within a range of $0 \leq \alpha \leq 60$ depending on the required output.

(4) The control section 7 turns off the switching element Q1 after lapse of electrical angle of $180°-\beta°$ (that is, after lapse of time of $((180°-\beta°)/360°)\times T$) from the time when the switching element Q1 is turned on. Here, $\beta$ is a margin angle to prevent the two switching elements of the upper and lower arms of each phase-winding from being turned on at the same time to thereby prevent the terminals of the battery 12 from being short-circuited.

(5) The control section 7 turns on the switching element Q2 of the lower arm corresponding to the same U-phase winding after lapse of $\beta°$ in electrical angle from the time of turning off of the switching element Q1.

(6) From then on, the control section 7 turns on and off the switching elements Q1 and Q2 alternately with the on period of $180°-\beta°$ and the off period of $\beta°$.

The switching elements Q3 and Q4 of the upper and lower arms corresponding to the V-phase winding are also turned on and off alternately with the on period of $180°-\beta°$ and the off period of $\beta°$ in accordance with basically the same control procedure as explained above. However, the timing to turn on the switching element Q3 for the first time is set to a time after lapse of electrical angle of $180°+\alpha°$ from the time of the voltage zero-cross point P (see FIG. 5) detected when the line-to-line voltage Vuv is lowering.

Also, the switching elements Q5 and Q6 of the upper and lower arms corresponding to the W-phase winding are also turned on and off alternately with the on period of $180°-\beta°$ and the off period of $\beta°$ in accordance with basically the same control procedure as explained above. However, the timing to turn on the switching element Q6 for the first time is set to a time after lapse of electrical angle of $120°+\alpha°$ from the time of the voltage zero-cross point P (see FIG. 5) detected when the line-to-line voltage Vuv is lowering.

On and off timings of the switching elements Q7 to Q12 for the other armature winding 3 are set in accordance with the same control procedure as that for the armature winding 2, for example, set based on voltage zero-cross points of the line-to-line voltage of the X-phase winding and the Y-phase winding.

After start of the phase control in which on and off timings of the respective switching elements are set based on detected voltage zero-cross points as explained above, a shift is made to the different phase control in which on and off timings of the respective switching elements are set based on detected current zero-cross points.

Figure 6:
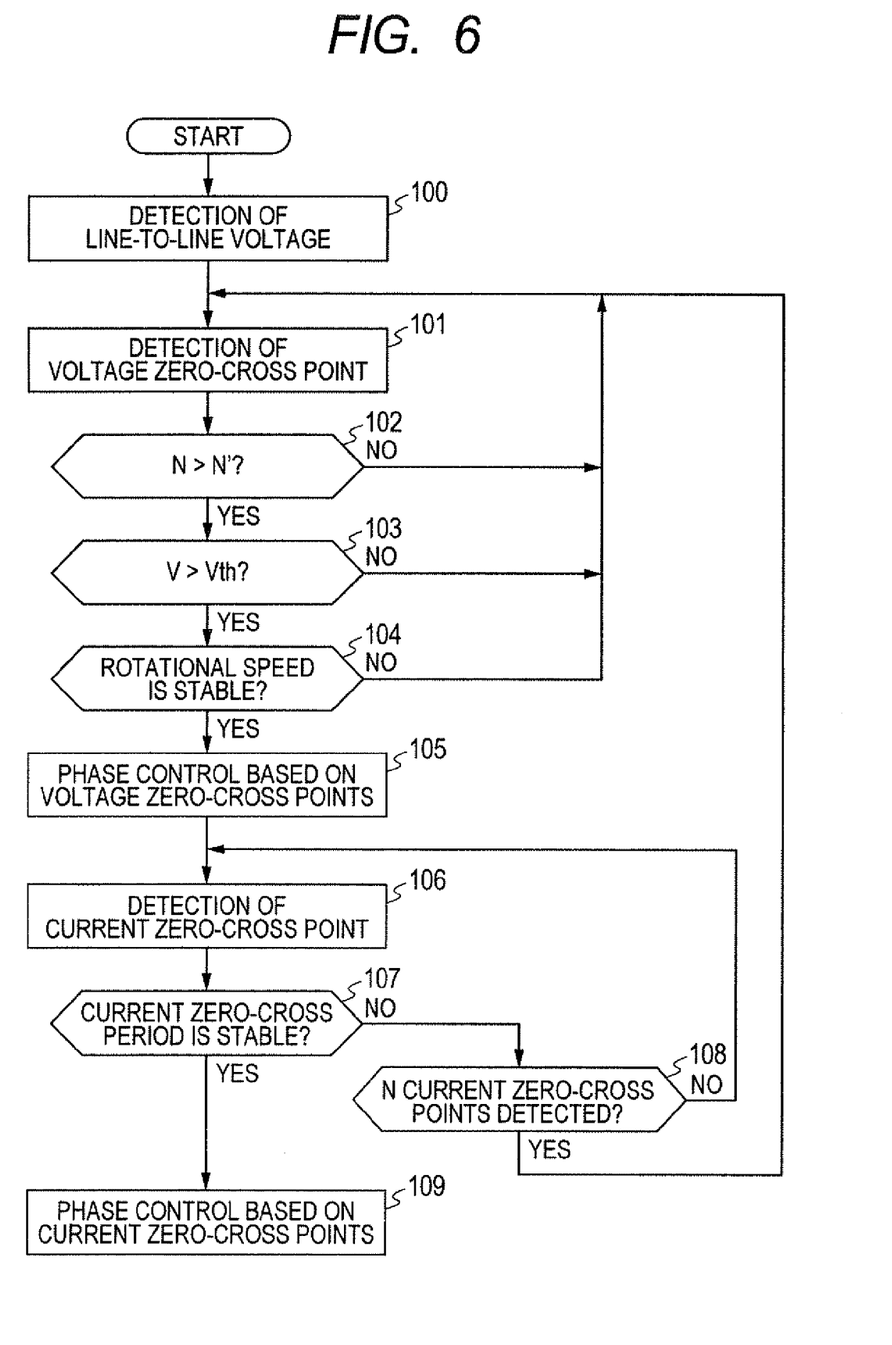
FIG. 6 is a flowchart showing a procedure to switch from phase control based on voltage zero-cross points to phase control based on current zero-cross points.

FIG. 6 is a flowchart showing a procedure to switch from the phase control based on voltage zero-cross points to the phase control based on current zero-cross points. The line-to-line voltage is detected by the voltage zero-cross detecting section 10 (step 100), and a zero-cross point is detected based on the detected line-to-line voltage (step 101). Thereafter, the control section 7 determines whether or not the rotational speed N of the vehicle generator 1 exceeds a reference rotational speed N' (step S102). If the determination result in step 102 is negative, the procedure returns to step S101 to detect a voltage zero-cross point again.

Figure 7:
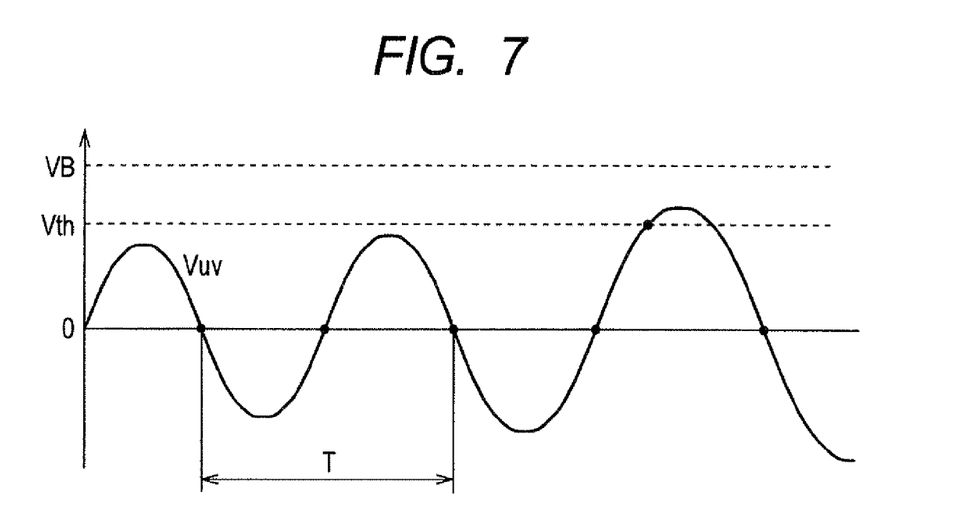
FIG. 7 is a diagram explaining how detection of voltage zero-cross points is carried out using a threshold voltage.

If the determination result in step 102 is affirmative, the procedure proceeds to step 103 to determine whether or not the wave height V of the line-to-line voltage Vuv exceeds a threshold voltage Vth. FIG. 7 is a diagram explaining how the detection of a voltage zero-cross point is carried out using the threshold voltage Vth. As shown in FIG. 7, the wave height V of the line-to-line voltage Vuv increases with time (or with increase of the rotational speed or field current) from when power generation is started, and exceeds the threshold voltage Vth at some time point. The procedure returns to step 101 to detect a voltage zero-cross point until the wave height V of the line-to-line voltage exceeds the threshold voltage Vth and the determination result in step 103 becomes affirmative.

When the determination result in step 103 becomes affirmative, the procedure proceeds to step 104 to determine whether or not the rotational speed is stable. This determination is made by comparing the presently detected rotational speed with the rotational speed which was previously detected based on the period T. If the determination result in step 104 is negative, the procedure returns to step 101 to detect a voltage zero-cross point again.

If the determination result in step 104 is affirmative, the control section 7 starts the phase control based on voltage zero-cross points (step 105).

Thereafter, the current zero-cross detecting section 9 detects current zero-cross points (step 106), and determines whether or not the zero-cross point period is stable (step 107). If the determination result in step 107 is negative, the procedure proceeds to step 108 to determine whether or not the control section 7 has detected a current zero-cross point (or current zero-cross point period) n times (n being a positive integer). The procedure returns to step 106 to detect a current zero-cross point until the control section 7 has detected a current zero-cross point n times, and the determination result in step 108 becomes affirmative. If the determination result in step 108 is affirmative, that is, if n current zero-cross points have been detected and the period is unstable, the procedure returns to step 101 to perform the operation of the voltage zero-cross point detection and the succeeding operations again.

On the other hand, if the determination result in step 107 is affirmative, the procedure proceeds to step 109 to start the phase control based on current zero-cross points.

Figure 8:
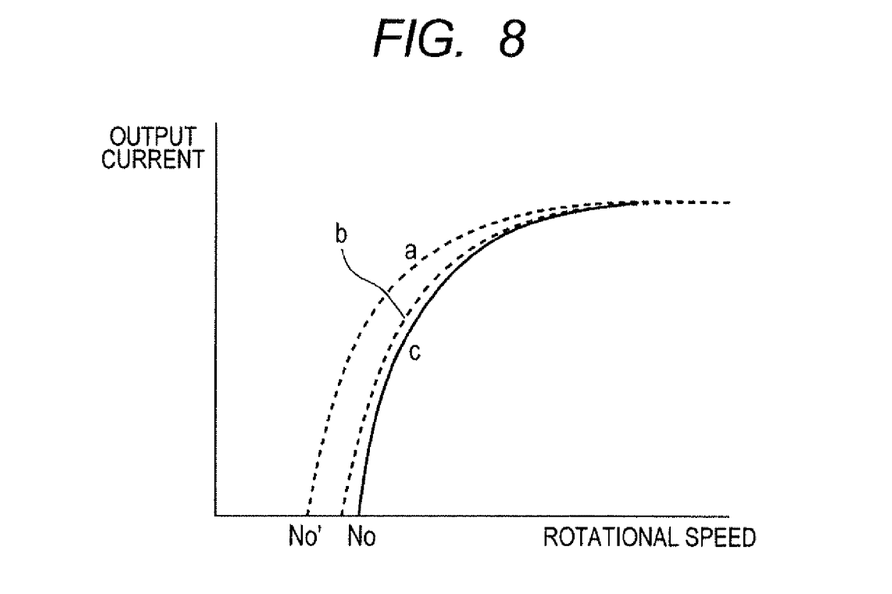
FIG. 8 is a diagram for explaining conditions to start the phase control.

FIG. 8 is a diagram for explaining conditions to start the phase control. In FIG. 8, the vertical axis represents the output current of the vehicle generator 1, and the horizontal axis represents the rotational speed of the vehicle generator 1. The curve a shows the output characteristic of the vehicle generator 1 when it operates in the phase control mode, the curve b shows the output characteristic of the vehicle generator 1 when it operates in the synchronous control mode, and the curve c shows the output characteristic of the vehicle generator 1 when the rectifying operation is performed only by the diodes (diode rectifying mode). Further, $N_0$ indicates the rotational speed at which the output current rises when the vehicle generator 1 operates in the diode rectifying mode, and $N_0'$ indicates the rotational speed at which the output current rises when the vehicle generator 1 operates in the phase control mode.

The phase control based on the detection result by the voltage zero-cross detecting section 10 is started when the required output current becomes more than the output current obtainable when the vehicle generator 1 operates in the diode rectifying mode. Accordingly, the phase control has to be started when the rotational speed is between $N_0$ and $N_0'$. Since the signal outputted from the voltage zero-cross detecting section 10 is a signal indicative of the rotational speed of the vehicle generator 1, the control section 7 detects the rotational speed N of the vehicle generator 1 based on the period T of the zero-cross points detected by the voltage zero-cross detecting section 10, and performs the operation to switch to the phase control based on the zero-cross points when the detected rotational speed N exceeds the rotational speed $N_0'$ which is used as the reference rotational speed N' in step 102 shown in FIG. 6.

The determination whether the detected rotational speed N exceeds the rotational speed $N_0'$ may be made in the voltage zero-cross detecting section 10. In this case, for example, the voltage zero-cross detecting section 10 outputs a signal indicative of a voltage zero-cross point having been detected to the control section 7 upon detecting that the detected rotational speed N exceeds the rotational speed $N_0'$. In response to the signal outputted from the voltage zero-cross detecting section 10, the control section 7 starts the operation to switch to the phase control based on current zero-cross points.

Since the wave height of the line-to-line voltage increases in proportion to the rotational speed of the vehicle generator 1, the control section 7 may be configured to start the operation to switch to the phase control based on current zero-cross points when the wave height of the line-to-line voltage exceeds a predetermined reference voltage set equal to or higher than the threshold voltage Vth shown in FIG. 7, without determining whether the detected rotational speed N exceeds the rotational speed $N_0'$ In this case, step 102 in FIG. 6 is omitted. Further, the control section 7 may be configured to start the operation to switch to the phase control based on current zero-cross points based on only the detected rotational speed. In this case, step 103 in FIG. 6 may be omitted.

According to the vehicle generator 1 of this embodiment, since voltage zero-cross points of the line-to-line voltage of each of the armature windings 2 and 3 are detected by the voltage zero-cross detecting section 10, it is possible to detect periodicity of the phase voltages even when they are significantly low, to enable starting the on-off control of the switching elements included in the switching sections 5 and 6 and connected to the armature windings 2 and 3.

The voltage zero-cross detecting section 10 performs detection of voltage zero-cross points when all the switching elements are off. This makes it possible to prepare for the control of the switching elements before power generation is started, to enable starting power generation at the same time when the switching elements starts to be controlled.

Further, since the on-off control of the switching elements based on voltage zero-cross points is started when the rotational speed of the vehicle generator 1 is lower than the rotational speed at which the output current rises in the diode rectifying mode, it is possible to take in the output current from the vehicle generator 1 as quickly as before the vehicle generator 1 starts to operate in the diode rectifying mode.

Further, since the vehicle generator 1 of this embodiment detects the phases (directions) of the phase currents by detecting current zero-cross points through the current zero-cross detecting section 9 after the phase control is started based on the detection result by the voltage zero-cross detecting section 10, it is possible to accurately control the phases of the phase currents.

Further, since off timings of the switching elements are set based on current zero-cross points at which the currents flowing into the respective switching elements change in polarity (direction) in the phase control mode, it is possible to turn off the switching elements after the currents flowing into the switching elements reverse in direction (that is, after the current drawing from the battery 12 into the phase windings is started), to thereby increase the output current.

It is a matter of course that various modifications can be made to the above embodiment as described below. In the structure shown in FIG. 1, one set of the control section 7, driver section 8, current zero-cross detecting section 9 and voltage zero-cross detecting section 10 are provided for the two switching sections 5 and 6. However, one set of the control section 7, driver section 8, current zero-cross detecting section 9 and voltage zero-cross detecting section 10 may be provided for each one of the two switching sections 5 and 6, or for each one of the phase windings.

Figure 9:
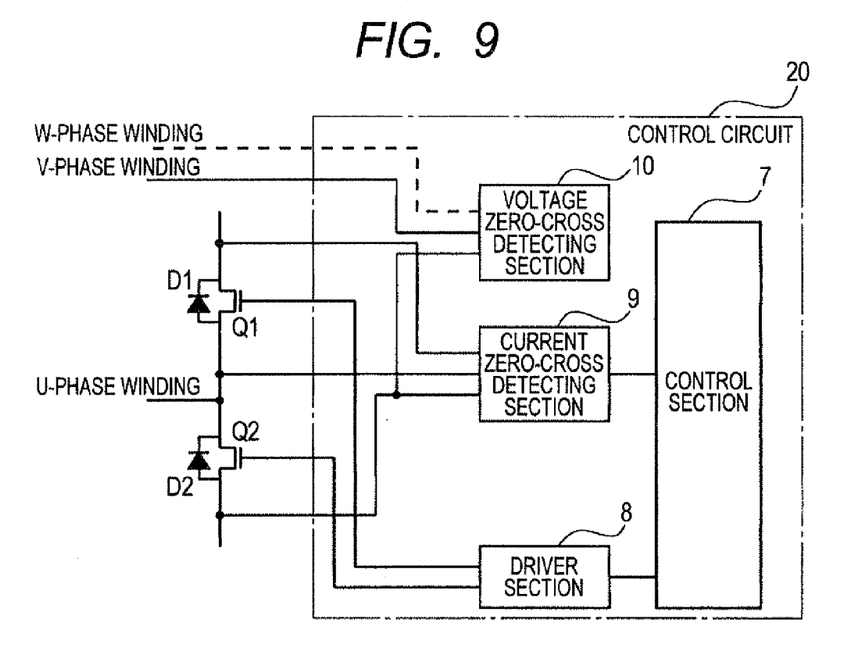
FIG. 9 is a diagram showing part of the structure of the vehicle generator modified such that a control section is provided for each of the phase windings.

FIG. 9 is a diagram showing the structure where one set of the control section 7, driver section 8, current zero-cross detecting section 9 and voltage zero-cross detecting section 10 is provided for each one of the phase windings. In this structure, a control circuit 20 constituted of the control section 7, driver section 8, current zero-cross detecting section 9 and voltage zero-cross detecting section 10 is provided for the switching elements Q1 and Q2 and the diodes D1 and D2 of the upper and lower arms corresponding to the U-phase winding. The voltage zero-cross detecting section 10 is connected to one end of the U-phase winding and one end of the V-phase winding, and detects the voltage between them as the line-to-line voltage of the vehicle generator 1. It is of course possible to detect the voltage between the U-phase and W-phase windings instead of the U-phase and V-phase windings, or to detect both the voltages between U-phase and V-phase windings and between U-phase and W-phase windings, or to detect the voltage between the V-phase and W-phase windings in addition to these two voltages. The control circuit 20 is also provided for each of the other phase windings. In the case of providing the control circuit 20 for each one of the phase windings, since the control circuit 20, and the switching elements and diodes of the upper and lower arms can be modularized as one semiconductor package, manufacture and assembly of the switching sections 5 and 6 and their control mechanisms can be made easy. In the case of such a modularization, the voltage zero-cross detecting section 10 may be provided for each of the semiconductor packages, or for one of the semiconductor packages for both or each of the armature windings 2 and 3.

In the above embodiment, the vehicle generator 1 includes two armature windings 2 and 3, and two switching sections 5 and 6. However, the present invention is applicable to a vehicle generator including one armature winding and one switching section, and also a vehicle generator including three or more sets of armature windings and switching sections.

In the above embodiment, voltage zero-cross points are detected based on the voltage between two of the output lines for the armature winding 2 or 3. However, voltage zero-cross points may be detected based on the voltages between each two of all the three output lines in order to improve the detection accuracy of voltage zero-cross points.

In the above embodiment, the on/off control of the switching elements included in the switching section 5 corresponding to the armature winding 2 is started with reference to voltage zero-cross points of the line-to-line voltage of the U-phase and V-phase windings of the armature winding 2. However, the on/off control (phase control) may be started with reference to voltage zero-cross points of the line-to-line voltage of the other armature winding 3.

Figure 10:
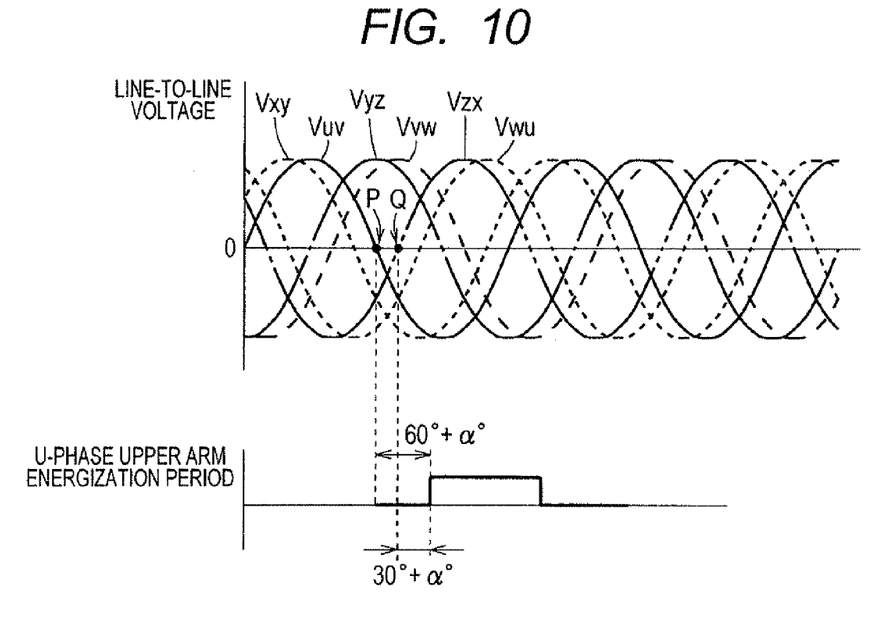
FIG. 10 is a diagram for explaining an example where the phase control is started by detecting voltage zero-cross points of a line-to-line voltage of the other armature winding of the vehicle generator.

FIG. 10 is a diagram for explaining an example where the phase control is started with reference voltage zero-cross points of the line-to-line voltage of the other armature winding 3. As shown in FIG. 10, the upward voltage zero-cross point Q at which the line-to-line voltage Vzx of the Z-phase and X-phase windings of the armature winding 3 crosses upward the zero line is shifted by 30° in electrical angle from the upward voltage zero-cross point P of the line-to-line voltage Vuv of the armature winding 2. Accordingly, the first on timing of the switching element Q1 of the upper arm corresponding to the U-phase winding (or the switching element Q3 or Q5) may be set based on this voltage zero-cross point 4.

In the above embodiment, current zero-cross points are used as references to set on/off timings of the switching elements Q1 and Q2 corresponding to the U-phase winding, and also as references to detect the rotational speed and variation of the rotational speed. However, the rotational speed and its variation may be detected based on current zero-cross points of the other phase (the V-phase or W-phase winding included in its own armature winding 2, or X-phase, Y-phase or Z-phase winding included in the other armature winding 3), or current zero-cross points of its own phase and the other phases. In the case of setting on/off timing to a time after lapse of a predetermined time from a reference time point, it is necessary to take into consideration the rotational speed and its variation as has been explained. By using current zero-cross points of also the other phases, it is possible to improve the detection accuracy of the rotational speed and its variation, to thereby improve the accuracy of setting on/off timings of the switching elements.

The above explained preferred embodiments are exemplary of the invention of the present application which is described solely by the claims appended below. It should be understood that modifications of the preferred embodiments may be made as would occur to one of skill in the art.

What is claimed is:

1. A vehicle generator comprising:
   an armature winding including a plurality of phase windings;
   a switching section formed as a bridge circuit constituted of a plurality of pairs of an upper arm and a lower arm connected in series to rectify voltages induced in the phase windings, each of the upper and lower arms being constituted of a switching element parallel-connected with a diode;
   a control section for controlling on/off timings of the switching elements; and
   a voltage zero-cross detecting section for performing voltage zero-cross detection to detect, as voltage zero-cross points, time points at which at least one of line-to-line voltages among the phase windings of the armature winding changes in polarity;
   the control section being configured to start on-off control of the switching elements based on the voltage zero-cross points detected by the voltage zero-cross detecting section.

2. The vehicle generator according to claim 1, wherein the voltage zero-cross detecting section performs the voltage zero-cross detection when phase voltages of the phase windings are lower than a vehicle battery charged by the vehicle generator.

3. The vehicle generator according to claim 1, wherein the voltage zero-cross detecting section performs the voltage zero-cross detection when all the switching elements are off.

4. The vehicle generator according to claim 1, wherein each of the switching elements is constituted of a MOSFET, and the control section starts the on-off control of the switching elements at a rotational speed of the vehicle generator lower than a rising rotational speed of the vehicle generator above which an output current of the vehicle generator can be obtained through rectification by parasitic diodes of the MOSFETs.

5. The vehicle generator according to claim 1, further comprising a current zero-cross detecting section for performing current zero-cross detection to detect, as current zero-cross points, time points at which at least one of phase currents of the armature winding changes in polarity, the control section being configured to perform on-off control of the switching elements based on the current zero-cross points detected by the current zero-cross detecting section instead of the voltage zero-cross points after the on-off control of the switching elements based on the voltage zero-cross points is started.

6. The vehicle generator according to claim 1, wherein the voltage zero-cross detecting section performs the voltage zero-cross detection for all of the phase windings of the armature winding.

\* \* \* \* \*